July 24, 1923.
J. O. ANDERSON ET AL
1,462,844
CHARGE PREHEATING AND VAPORIZING DEVICE
Filed May 10, 1922      3 Sheets-Sheet 1
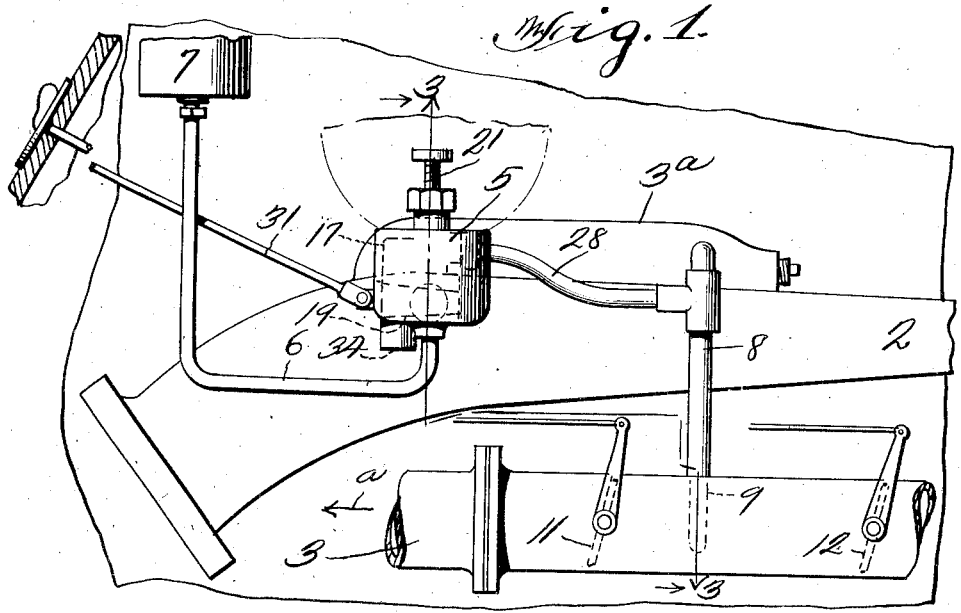
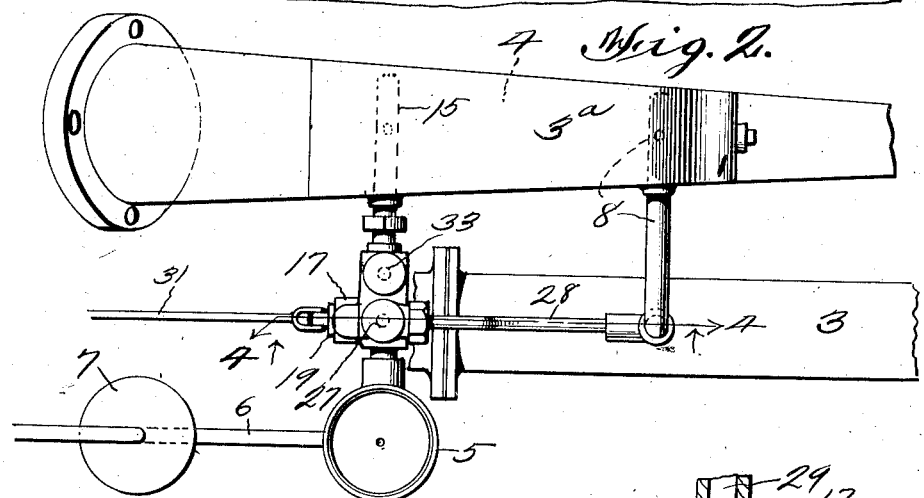
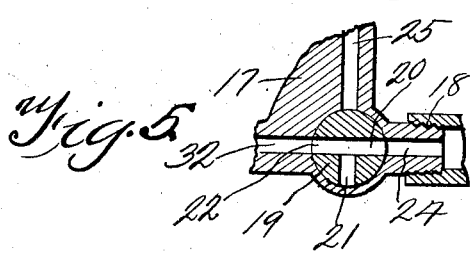
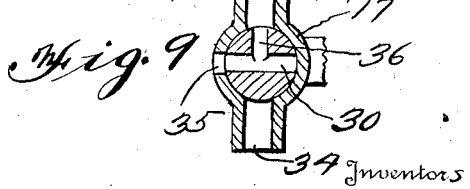
Inventors
J. O. Anderson
O. P. Peterson
By D. Swift
Attorney

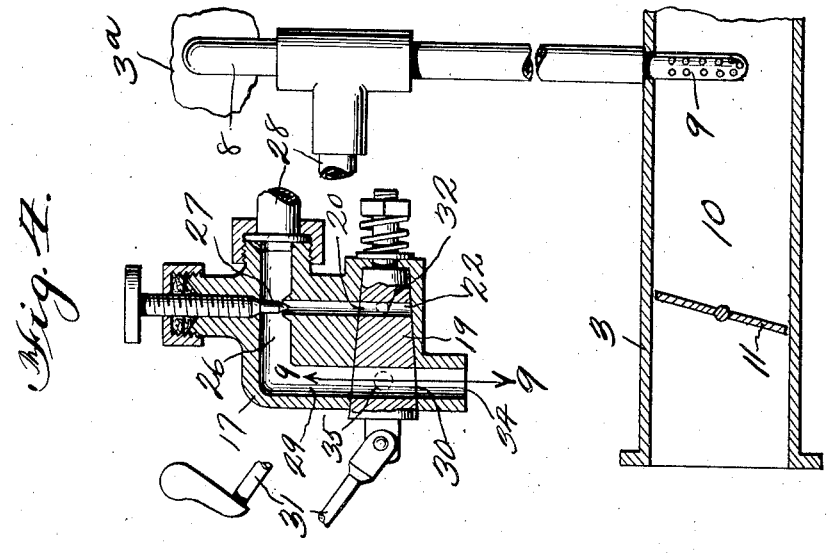
July 24, 1923.
J. O. ANDERSON ET AL
CHARGE PREHEATING AND VAPORIZING DEVICE
Filed May 10, 1922    3 Sheets-Sheet 2
1,462,844
Inventors
J. O. Anderson,
O. P. Peterson
D. Swift
Attorney

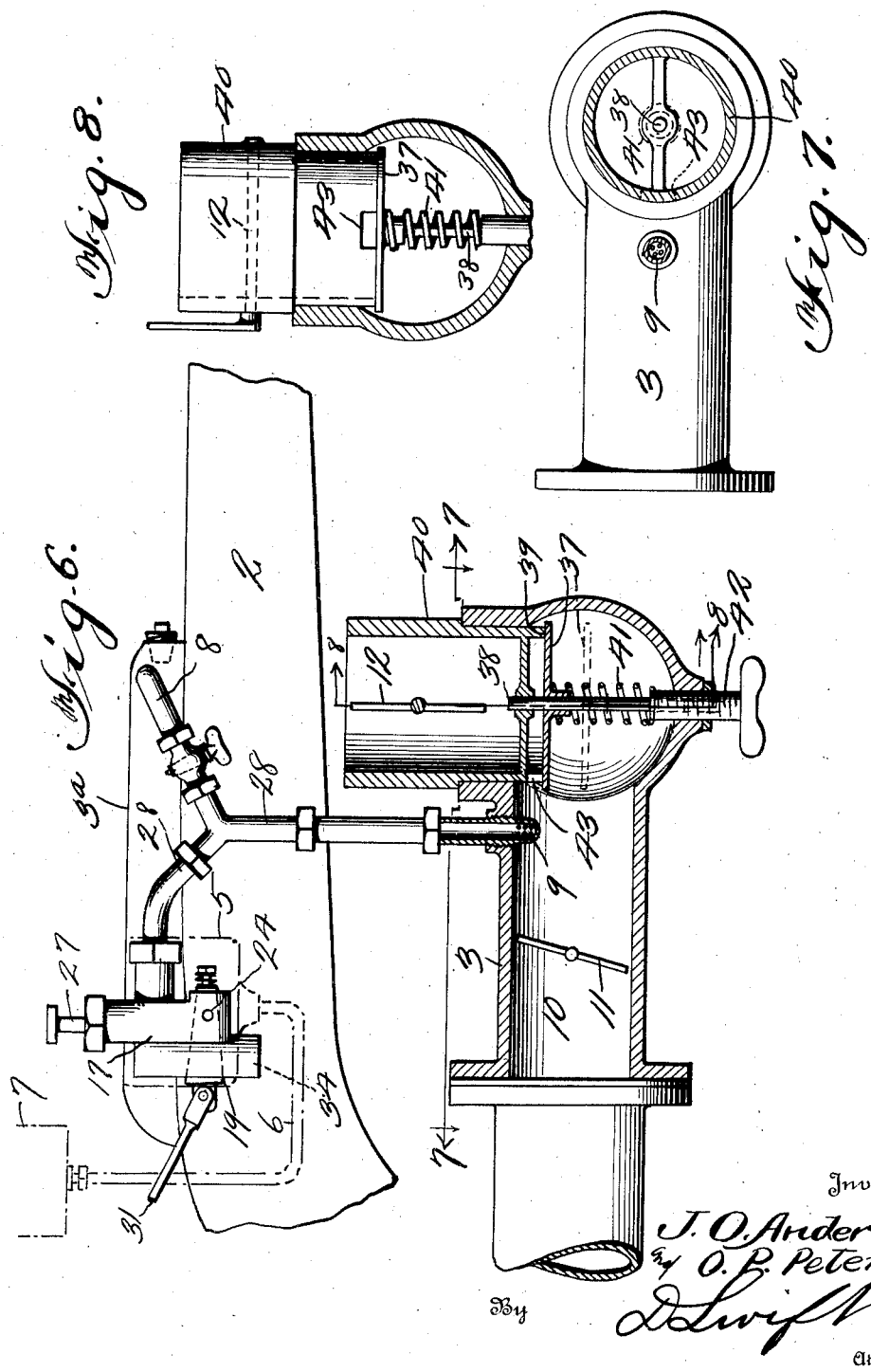

Patented July 24, 1923.

1,462,844

UNITED STATES PATENT OFFICE.

JOHN OSCAR ANDERSON AND OSCAR P. PETERSON, OF ELY, MINNESOTA.

CHARGE PREHEATING AND VAPORIZING DEVICE.

Application filed May 10, 1922. Serial No. 559,962.

*To all whom it may concern:*

Be it known that we, JOHN O. ANDERSON and OSCAR P. PETERSON, citizens of the United States, residing at Ely, in the county of St. Louis, State of Minnesota, have invented new and useful Charge Preheating and Vaporizing Devices; and we do hereby declare the following to be a full, clear, and exact description of the invention, such as will enable others skilled in the art to which it appertains to make and use the same.

The invention relates to charge preheating and vaporizing devices for internal combustion engines, and has for its object to provide a device of this character comprising valve means supported by an auxiliary preheating chamber formed on the exhaust pipe of the engine and in communication with a liquid fuel supply, said valve means forming means whereby upon starting of the engine a supply of fuel will be allowed to be sucked through the valve means, mixed with air as it is atomized by one of the valves and then passed to the intake manifold of the engine where it is conveyed to the combustion chambers of the engine. Also to so construct the valve means whereby after the engine has been started and the exhaust manifold heated for heating the auxiliary chamber carried thereby, the fuel may be caused to pass through a spraying valve, thence preheated in the auxiliary chamber and sucked to the intake manifold of the engine in a preheated condition thereby volatilizing the charge.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the device showing the same applied to a conventional form of internal combustion engine.

Figure 2 is a top plan view.

Figure 3 is a vertical sectional view taken on line 3—3 of Figure 1.

Figure 4 is a sectional view through the valve structure taken on line 4—4 of Figure 2.

Figure 5 is a detail sectional view showing the controlling valve turned 90 degrees in one direction, whereby fuel will be forced to pass through the heating chamber of the exhaust manifold.

Figure 6 is side elevation of a conventional form of engine, showing the device applied thereto, and showing an air admitting valve carried by the intake manifold intermediate the choke valve and a throttle valve.

Figure 7 is a horizontal sectional view taken on line 7—7 of Figure 6.

Figure 8 is a vertical sectional view taken on line 8—8 of Figure 6.

Figure 9 is a sectional view through a portion of the valve casing and air passage taken on line 9—9 of Figure 4 and showing the plug valve turned ninety degrees to the left.

Referring to the drawing, the numeral 1 designates a portion of a conventional form of internal combustion engine and 2 an exhaust manifold carried thereby through which particles of combustion from the engine pass and consequently the hot gases heat the exhaust manifold. Located adjacent the engine 1 is an intake manifold 3 through which gases pass to the cylinders of the engine in the direction of the arrow $a$. Formed integral with the exhaust manifold 2 is a preheating casing $3^a$ through the chamber 4 of which gases from the carbureter bowl 5 pass and are preheated, said carbureter bowl being connected by means of a pipe 6 preferably to a vacuum tank 7, however it may be connected to any other source of fuel supply. Extending into one end of the chamber 4 is a pipe 8, the other end of which pipe terminates in a nozzle 9 which extends into the mixing chamber 10 of the intake manifold 3, preferably between the throttle valve 11 and the choker valve 12 where gases will be mixed and before they pass to the cylinders of the engine. Threaded into the casing 3 at 13 is a nozzle 15, which nozzle has threaded thereto at 16 a valve casing 17 which casing has secured thereto at 18 the carbureter bowl 5. Rotatably mounted in the valve casing 17 is a plug valve 19 which is provided with three ports 20, 21, and 22. The ports 20, 21 and 22 are disposed at ninety degrees from each other and when positioned as shown in Figure 3, the port 21 registers with the port 24, which is in communication with the carbureter bowl 5 and the port 20 registers with the vertically disposed passage 25 through which fuel is sucked on the intake impulses of the engine to the horizontally disposed port 26 past the needle valve 27. It will be seen that on the intake impulses of the piston that fuel from the carbureter bowl 5 will be sucked therefrom and sprayed or vaporized by the needle valve 27 and then sucked through the connecting pipe 28, the lower portion of the pipe 8, spraying nozzle 9 and thence to the engine through the intake manifold 3. During the intaking of the charge air is sucked through the vertically disposed passage 29 in the valve casing 17 from the atmosphere and through the port 30 in the outer end of the plug valve 19 adjacent its controlling rod 31, thereby thoroughly mixing the gases and vaporizing the same. It has been found that during the intaking of the engine on the various intake strokes of the pistons thereof that the suction is an exceedingly strong one, thereby thoroughly vaporizing the gases and consequently obtaining the maximum efficiency.

After the engine has been started as above set forth during which time the port 32 has been closed the exhaust manifold has become heated, thereby heating the casing 3 and the air within the chamber 4, therefore to preheat the vaporized charge before it passes through the intake manifold to obtain a higher efficiency, the plug valve 19 is rotated in the direction of the arrow *a*, ninety degrees, which rotation will bring the port 20 in registration with the port 24 and the port 22 in registration with the port 32, at the same time the fuel passage 25 is closed and consequently on the intake strokes of the pistons, fuel will pass transversely through the valve 19, the port 32 and pass the spraying nozzle 33, thence through the nozzle 15 and into the chamber 4 of the casing 3. After the vaporized gases enter the chamber 4 where they are thoroughly heated, the gases pass longitudinally through the chamber 4, thence through the pipe 8 to the mixing chamber 10 of the intake manifold 3. By preheating the gases they are volatilized in such a manner that they will more quickly ignite and will render the maximum efficiency. When the plug valve 19 is so positioned as to direct the gases through the preheating chamber 4 as set forth above the air port 30 in the plug valve 19 will be shut off from the intake end 34 of the air port 29 and will be disposed transversely and horizontally and no air can pass into the air port 29. If the air passage 29 were not closed, the suction through the preheating chamber 4 would be broken and the device would be inoperative. When the plug valve 19 is turned to the left in the direction of the arrow *b*, Figure 3, from the position shown in Figure 3, the ports 20, 21 and 22 of the plug valve 19 will supply gasoline to both of the needle valves 27 and 33 and air to the carbureter passage will be admitted through the port 35 as clearly shown in Figure 9. In this position the air passes through the port 35, the port 30 in the plug valve, the communicating port 36 in the plug valve, which is disposed at a right angle to the port 30 and thence to the vertically disposed air port 29. This position is only used when desired and preferably when switching from carbureter to generator, however the position is not needed when the car is running on a road, because it will not be noticed if the valve is turned directly from carbureter position to preheater and generator position. Referring to Figure 3 and the position of the plug 19 shown therein, if said plug is turned one hundred and eighty degrees to the right, the port from the carbureter bowl 5 will be closed, which position if desired to be used is only used when the engine is not running.

Referring to Figures 6, 7 and 8 wherein an additional air supply valve 37 is provided intermediate the throttle valve 11 and the choke valve 12, said valve 37 being slidably mounted on a valve stem 38 and held in engagement with the lower end 39 of the cylindrical member 40 by means of a coiled spring 41 which surrounds the valve stem 38 and is interposed between the adjusting screw 42 and the valve 37. It will be seen that by adjusting the screw 42 that the tension of the spring 41 may be varied and consequently the power of the suction necessary to unseat the valve 37 may be varied thereby regulating the necessary amount of air to be sucked into the mixing chamber 10. However during idling sufficient air is admitted through the port 43 in the cylindrical member 40 to supply oxygen to the mixing chamber 10.

From the above it will be seen that a preheater and volatilizer is provided for gaseous charges before they enter the mixing chamber and intake manifold of an internal combustion engine. It will also be seen that means is provided whereby the generating and heating chamber 4 will be thoroughly heated before charges are sucked therethrough thereby preventing flooding of the chamber 4 or danger of explosion therein.

The invention having been set forth what is claimed as new and useful is:—

1. The combination with an exhaust manifold of an internal combustion engine, an intake manifold, a fuel supply device, of means for volatilizing, vaporizing and preheating the fuel as it passes from the fuel supply device to the intake manifold, said means comprising a valve casing adjacent the exhause manifold, a pipe carried by the valve casing and extending into a preheating chamber carried by the exhaust manifold, spaced needle valves cooperating with valve seats, a three-way plug valve rotatably mounted in the valve casing and cooperating with a fuel supply port and ports controlled by the needle valves, a pipe connection direct to the intake manifold from the port controlled by one of said needle valves, means for admitting air through a port in the plug valve to the last named needle valve, and means whereby by rotating the plug valve fuel will pass by the other needle valve to the preheating chamber and a pipe connection between the preheating chamber and the intake manifold.

2. The combination with a fuel supply device, a preheating chamber carried by an exhaust manifold, of means comprising spaced needle valves and a rotatable plug valve whereby fuel may be allowed to pass to an intake manifold direct past one of said valves, means for admitting air to said last named means, said plug valve forming means whereby fuel will be sucked through the preheating chamber to the intake manifold.

3. A controlling valve for controlling the flow of fuel from a fuel supply device through an intake manifold by a pipe, or through a preheating chamber carried by an exhaust manifold to a pipe connected to the intake manifold, said valve comprising a casing, three ports carried by said casing, needle valves cooperating with seats carried by two of said ports, a three-way plug valve rotatably mounted in the casing and cooperating with said ports and forming means whereby fuel may be admitted direct to the intake manifold, directed through the preheating chamber to the manifold or direct to the manifold and simultaneously to the manifold through the preheating chamber.

4. A controlling valve for controlling the flow of fuel from a fuel supply device through an intake manifold by means of a pipe, or through a preheating chamber carried by an exhaust manifold to a pipe connected to the intake manifold, said valve comprising a casing, three ports carried by said casing, needle valves cooperating with seats carried by two of said ports, a three-way plug valve rotatably mounted in the casing and cooperating with all of said ports and forming means whereby fuel may be admitted in vaporized condition to the intake manifold direct and also forming means whereby direct feeding of fuel may be cut off and fuel supplied through the preheating chamber.

5. A controlling valve for controlling the flow of fuel from a fuel supply device to an intake manifold by means of a pipe, or through a preheating chamber carried by an exhaust manifold to a pipe connected to the intake manifold, said valve comprising a casing, three ports carried by said casing, needle valves cooperating with seats carried by two of said ports, a three way plug valve rotatably mounted in the casing and cooperating with all of said ports and forming means for direct fuel feeding to the intake manifold or indirect feed through the preheating chamber and means for supplying air to the fuel from the atmosphere on direct feeding of fuel.

In testimony whereof we have signed our names to this specification in the presence of two subscribing witnesses.

JOHN OSCAR ANDERSON.
OSCAR PETER PETERSON.

Witnesses:
A. L. SUNDHOLM,
GERTRUDE CHIMZAR.